US010323767B2

(12) United States Patent
Graichen et al.

(10) Patent No.: US 10,323,767 B2
(45) Date of Patent: *Jun. 18, 2019

(54) SPRUNG GATE VALVES MOVABLE BY AN ACTUATOR

(71) Applicant: Dayco IP Holdings, LLC, Troy, MI (US)

(72) Inventors: Brian M. Graichen, Leonard, MI (US); David E. Fletcher, Flint, MI (US); Matt Gilmer, Whitmore Lake, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/820,840

(22) Filed: Nov. 22, 2017

(65) Prior Publication Data

US 2018/0094744 A1    Apr. 5, 2018

Related U.S. Application Data

(63) Continuation of application No. 14/277,815, filed on May 15, 2014, now Pat. No. 9,845,998.

(Continued)

(51) Int. Cl.
*F16K 3/16* (2006.01)
*F16K 3/18* (2006.01)
(Continued)

(52) U.S. Cl.
CPC .......... *F16K 31/1221* (2013.01); *B60T 13/46* (2013.01); *B60T 17/02* (2013.01);
(Continued)

(58) Field of Classification Search
CPC ...... F16K 3/029; F16K 3/0227; F16K 3/0668; F16K 3/1221; F16K 3/16;
(Continued)

(56) References Cited

U.S. PATENT DOCUMENTS 2,204,142 A    6/1940  MacClatchie
2,306,490 A   12/1942  Noble
(Continued)

FOREIGN PATENT DOCUMENTS

CA    1063454      10/1979
CN    2085459 U     9/1991
(Continued)

OTHER PUBLICATIONS

CN, Second Office Action and Search Report with English translation, Chinese Patent Application No. 2014103919357; 12 pages, dated Apr. 1, 2017.

(Continued)

*Primary Examiner* — Mary E McManmon
*Assistant Examiner* — Richard K. Durden
(74) *Attorney, Agent, or Firm* — FisherBroyles, LLP; Susan M. Oiler

(57) ABSTRACT

Valves having a sprung gate of various constructions are disclosed. In one embodiment, the sprung gate includes a first endless elastic band having an inner perimeter defining an open space sandwiched between a first gate member and a second gate member that each define an opening therethrough in an open position portion thereof. The first endless elastic band is sandwiched therebetween with its open space oriented for alignment with the opening in both of the first and second gate members, which are aligned with one another to form a passage through the sprung gate. In one aspect, the first endless elastic band in positioned inward a distance from the outer sides of the first and second gate members and spaces the first gate member a distance apart from the second gate member thereby defining a channel having a bottom defined by the first endless elastic band.

12 Claims, 9 Drawing Sheets

Related U.S. Application Data

(60) Provisional application No. 61/829,463, filed on May 31, 2013.

(51) Int. Cl.
| | | |
|---|---|---|
| *F16K 31/122* | (2006.01) | |
| *F16K 31/08* | (2006.01) | |
| *F16K 3/02* | (2006.01) | |
| *B60T 13/46* | (2006.01) | |
| *B60T 17/02* | (2006.01) | |
| *F02M 35/10* | (2006.01) | |

(52) U.S. Cl.
CPC .............. *F16K 3/0227* (2013.01); *F16K 3/18* (2013.01); *F16K 31/084* (2013.01); *F02M 35/10229* (2013.01); *F16K 3/16* (2013.01)

(58) Field of Classification Search
CPC ......... Y10T 137/0514; Y10T 137/6072; Y10T 137/6075; Y10T 137/6079; Y10T 137/6082
USPC ........ 251/175, 193, 195, 196, 326, 327, 329
See application file for complete search history.

(56) References Cited

U.S. PATENT DOCUMENTS

| | | |
|---|---|---|
| 2,705,610 A | 4/1955 | Hjulian |
| 2,750,962 A | 6/1956 | Kreichman et al. |
| 2,816,730 A | 12/1957 | Rabas |
| 2,913,220 A | 11/1959 | Cover |
| 2,953,346 A | 9/1960 | Liecke et al. |
| 3,069,131 A | 12/1962 | Grove |
| 3,113,757 A | 12/1963 | Nixon |
| 3,203,447 A | 8/1965 | Bremner et al. |
| 3,379,214 A | 4/1968 | Weinberg |
| 3,478,771 A | 11/1969 | Johnson |
| 3,534,307 A | 10/1970 | Spewock et al. |
| 3,635,601 A | 1/1972 | Larson et al. |
| 3,706,321 A | 12/1972 | Vicari |
| 3,768,774 A | 10/1973 | Baugh |
| 3,871,616 A | 3/1975 | Taylor |
| 4,010,928 A | 3/1977 | Smith |
| 4,013,090 A | 3/1977 | Taylor |
| 4,056,255 A | 11/1977 | Lace |
| 4,146,209 A | 3/1979 | Leva |
| 4,157,169 A | 6/1979 | Norman |
| 4,179,099 A | 12/1979 | Pierce, Jr. |
| 4,210,308 A | 7/1980 | Sims |
| 4,253,487 A | 3/1981 | Worley et al. |
| 4,321,652 A | 3/1982 | Baker et al. |
| 4,340,336 A | 7/1982 | Clary |
| 4,341,369 A | 7/1982 | Meyer |
| 4,385,280 A | 5/1983 | Reisem |
| 4,446,887 A | 5/1984 | Redmond et al. |
| 4,535,967 A | 8/1985 | Babbitt et al. |
| 4,568,058 A | 2/1986 | Shelton |
| 4,585,207 A | 4/1986 | Shelton |
| 4,638,193 A | 1/1987 | Jones |
| 4,779,582 A | 10/1988 | Lequesne |
| 4,934,652 A | 6/1990 | Golden |
| 5,000,215 A | 3/1991 | Phillips |
| 5,059,813 A | 10/1991 | Shiroymama |
| 5,172,658 A | 12/1992 | Hampton |
| 5,195,722 A | 3/1993 | Bedner |
| 5,234,088 A | 8/1993 | Hampton |
| 5,235,941 A | 8/1993 | Hampton |
| 5,377,955 A | 1/1995 | Baker |
| 5,394,131 A | 2/1995 | Lungu |
| 5,627,504 A | 5/1997 | Kleinhappl |
| 5,685,519 A | 11/1997 | Bircann et al. |
| 5,909,525 A | 6/1999 | Miller et al. |
| 6,057,750 A | 5/2000 | Sheng |
| 6,158,718 A | 12/2000 | Lang et al. |
| 6,199,587 B1 | 3/2001 | Shlomi et al. |
| 6,337,612 B1 | 1/2002 | Kim et al. |
| 6,425,410 B1 | 7/2002 | Taylor |
| 6,442,955 B1 | 9/2002 | Oakner et al. |
| 6,563,238 B1 | 5/2003 | Lee et al. |
| 6,827,331 B1 | 12/2004 | Roos |
| 7,017,886 B1 | 3/2006 | Ngene-Igwe |
| 7,108,008 B2 | 9/2006 | Moreno |
| 7,126,449 B2 | 10/2006 | Nickel et al. |
| 7,523,916 B2 | 4/2009 | Fenton |
| 7,849,674 B2 | 12/2010 | Masuda et al. |
| 8,235,011 B2 | 8/2012 | Lengfeld et al. |
| 8,561,392 B2 | 10/2013 | Ogunleye et al. |
| 2002/0066877 A1 | 6/2002 | Nakagawa |
| 2006/0016477 A1 | 1/2006 | Zaparackas |
| 2006/0219302 A1 | 10/2006 | Knop |
| 2008/0099710 A1 | 5/2008 | Jennings |
| 2009/0020719 A1 | 1/2009 | Ishigaki |
| 2009/0094009 A1 | 4/2009 | Muller |
| 2011/0006240 A1 | 1/2011 | Williams et al. |
| 2011/0132311 A1 | 6/2011 | Pursifull et al. |
| 2012/0256111 A1 | 10/2012 | Hoang et al. |
| 2012/0256113 A1 | 10/2012 | Comeaux |
| 2012/0286182 A1 | 11/2012 | Hoang et al. |
| 2012/0313023 A1 | 12/2012 | Brock |
| 2013/0061949 A1 | 3/2013 | Minezawa et al. |
| 2013/0062548 A1 | 3/2013 | Yokomi |
| 2013/0340732 A1 | 12/2013 | Pursifull et al. |
| 2014/0353534 A1 | 12/2014 | Graichen et al. |
| 2015/0060709 A1 | 3/2015 | Fletcher et al. |
| 2015/0090355 A1 | 4/2015 | Fletcher et al. |
| 2015/0159677 A1 | 6/2015 | Hampton et al. |
| 2015/0354600 A1 | 12/2015 | Fletcher et al. |
| 2016/0153472 A1 | 6/2016 | Fletcher et al. |

FOREIGN PATENT DOCUMENTS

| | | |
|---|---|---|
| CN | 1205065 | 1/1999 |
| CN | 2480633 Y | 3/2002 |
| CN | 2534389 Y | 2/2003 |
| CN | 101036012 | 9/2007 |
| CN | 101772624 | 7/2010 |
| CN | 201679974 | 12/2010 |
| CN | 101963240 | 2/2011 |
| CN | 201866285 | 6/2011 |
| CN | 102996837 | 3/2013 |
| DE | 501348 | 7/1930 |
| DE | 2714933 A1 | 10/1978 |
| DE | 3209199 A1 | 9/1983 |
| DE | 19727602 | 10/1998 |
| DE | 19841499 A1 | 3/2000 |
| EP | 0577933 A1 | 1/1994 |
| EP | 1333207 A2 | 6/2003 |
| GB | 1411303 | 10/1975 |
| JP | S59-214280 | 12/1984 |
| JP | S61-100423 | 8/1986 |
| JP | 3665674 B2 | 6/2005 |
| WO | 1995/29356 A1 | 11/1995 |
| WO | 2001/014775 A1 | 3/2001 |
| WO | 2009/045140 A1 | 4/2009 |
| WO | 2012100287 A1 | 8/2012 |
| WO | 2013/049643 A1 | 4/2013 |

OTHER PUBLICATIONS

U.S. Final Office Action, U.S. Appl. No. 14/473,151; 42 pages, dated Apr. 19, 2017.
U.S. Notice of Allowance, U.S. Appl. No. 14/565,814; 12 pages, dated Feb. 28, 2017.
EP, Supplementary European Search Report; Patent Application No. 14840859.4; 7 pages, dated Mar. 22, 2017.
EP, European Search Report and European Search Opinion, European Application No. 14805033.9, 7 pages, dated Dec. 15, 2016.
CN, Search Report with English translation; Patent Application No. 201480002102.5; (dated Jul. 26, 2016).
CN, Office Action with English translation; Patent Application No. 201480002102.5; (dated Aug. 3, 2016).
CN, Office Action and Search Report with English translation; Patent Application No. 201410391935.7; (dated Sep. 2, 2016).

(56) References Cited

OTHER PUBLICATIONS

CN, Office Action and Search Report with English translation; Patent Application No. 201480002180.5; (dated Sep. 2, 2016).
U.S. Notice of Allowance; U.S. Appl. No. 14/567,450; (dated Oct. 11, 2016).
U.S. Non-Final Office Action; U.S. Appl. No. 14/565,814; (dated Jul. 21, 2016).
U.S. Non-Final Office Action; U.S. Appl. No. 14/473,151; (dated May 19, 2016).
U.S. Non-Final Office Action; U.S. Appl. No. 14/567,450; (dated May 19, 2016).
CN, Search Report; Patent Application No. 2014800021010 (dated Mar. 22, 2016).
CN, First Office Action; Patent Application No. 2014800021010 (dated Mar. 30, 2016).
CN, First Office Action with English Translation; Patent Application No. 201480001143.2 (dated Feb. 3, 2016).
CN, Search Report; Patent Application No. 201480001143.2 (dated Jan. 22, 2016).
PCT, International Search Report and Written Opinion, International Application No. US/2014/038018 (dated Nov. 26, 2014).
PCT, International Search Report and Written Opinion, International Application No. US/2014/053435 (dated Dec. 18, 2014).
PCT, International Search Report and Written Opinion, International Application No. US/2014/065252 (dated Feb. 19, 2015).
PCT, International Search Report and Written Opinion, International Application No. US/2014/069461 (dated Mar. 4, 2015).
PCT, International Search Report and Written Opinion, International Application No. US/2014/069528 (dated Mar. 10, 2015).
PCT, International Search Report and Written Opinion, International Application No. US/2014/069796 (dated Mar. 12, 2015).
U.S. Notice of Allowance; U.S. Appl. No. 14/539,656; (dated Dec. 15, 2015).

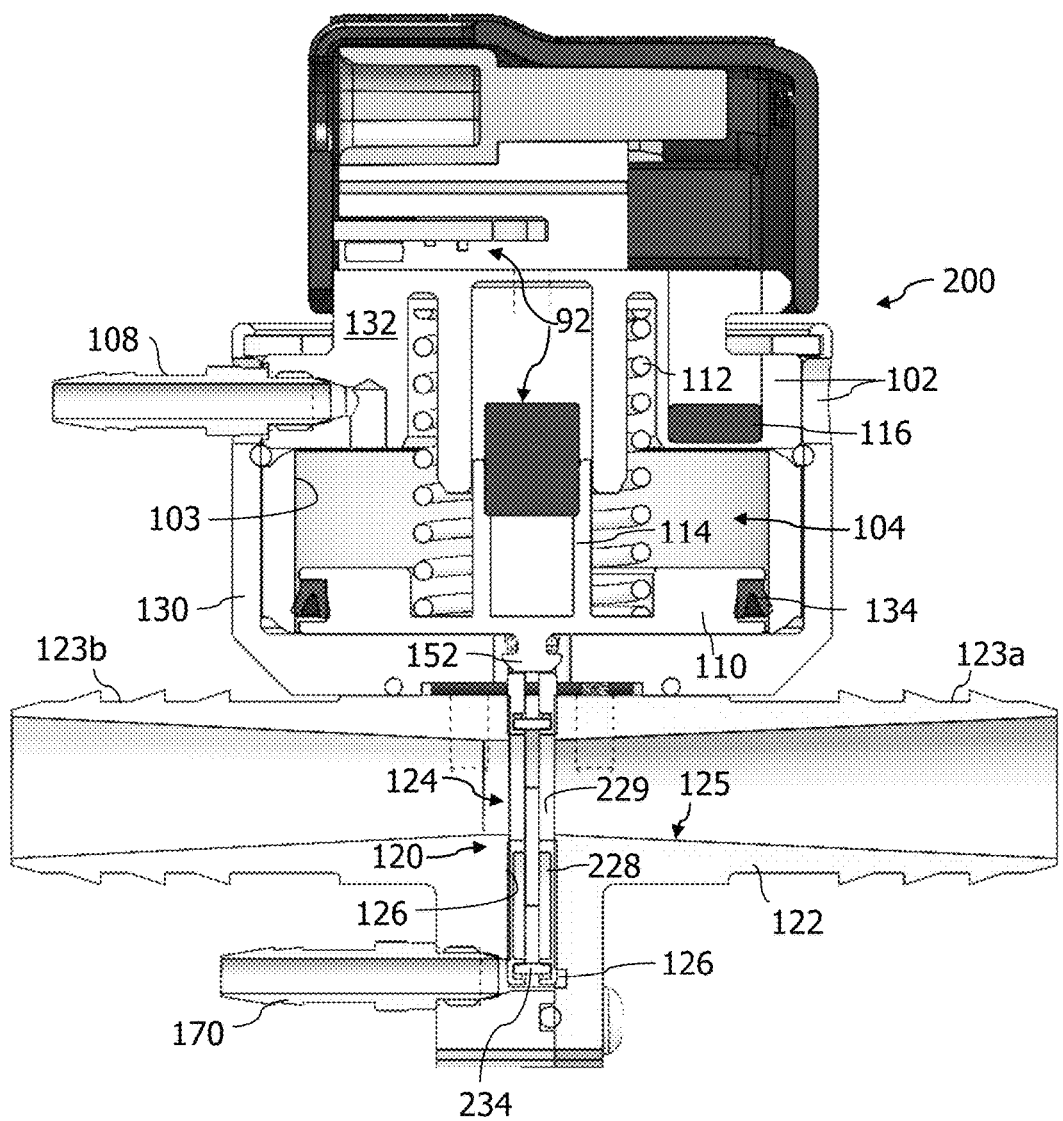

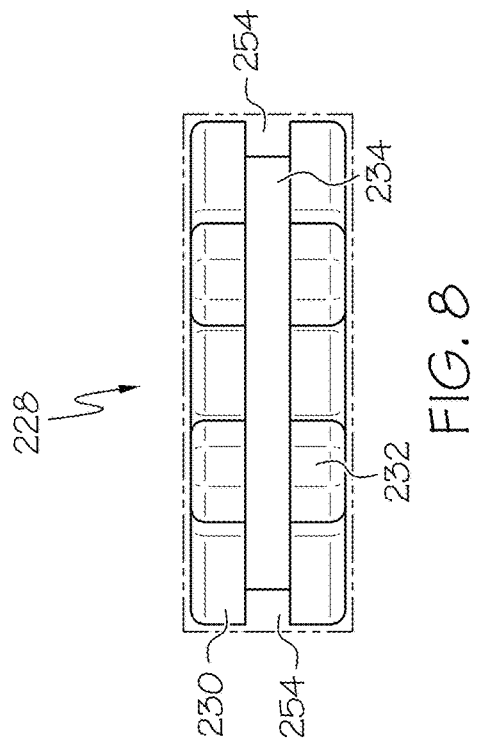
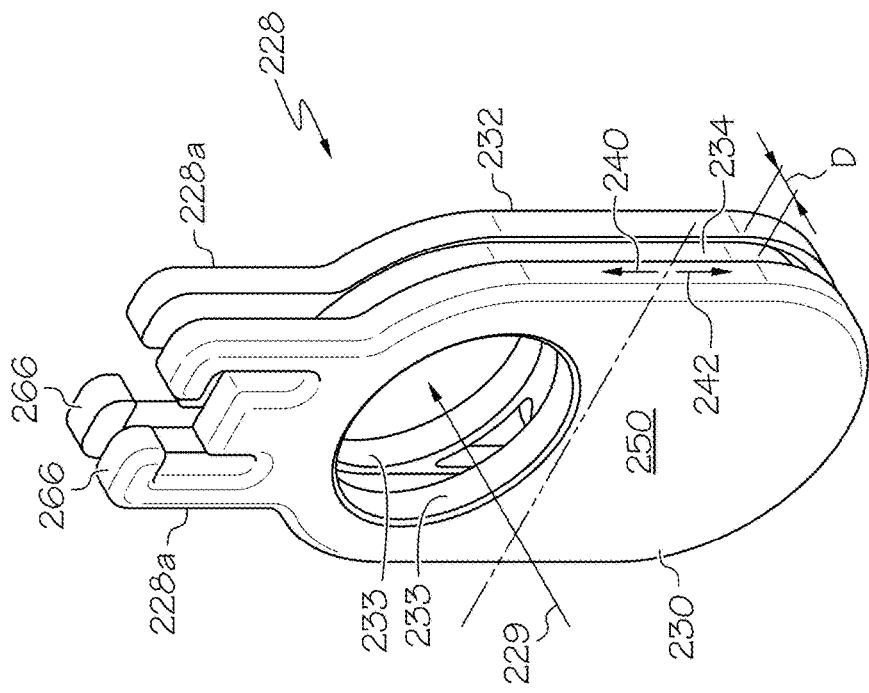

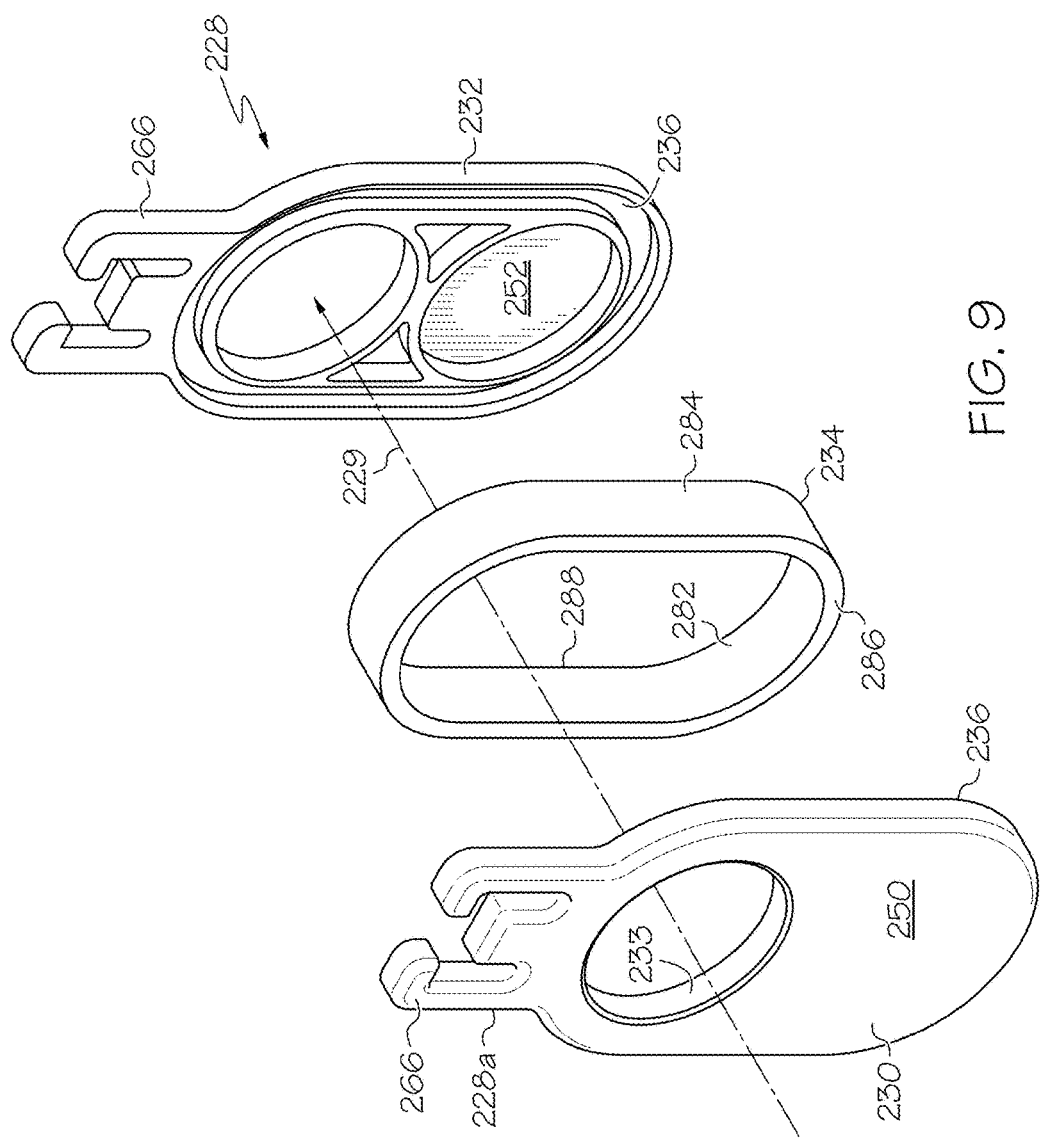

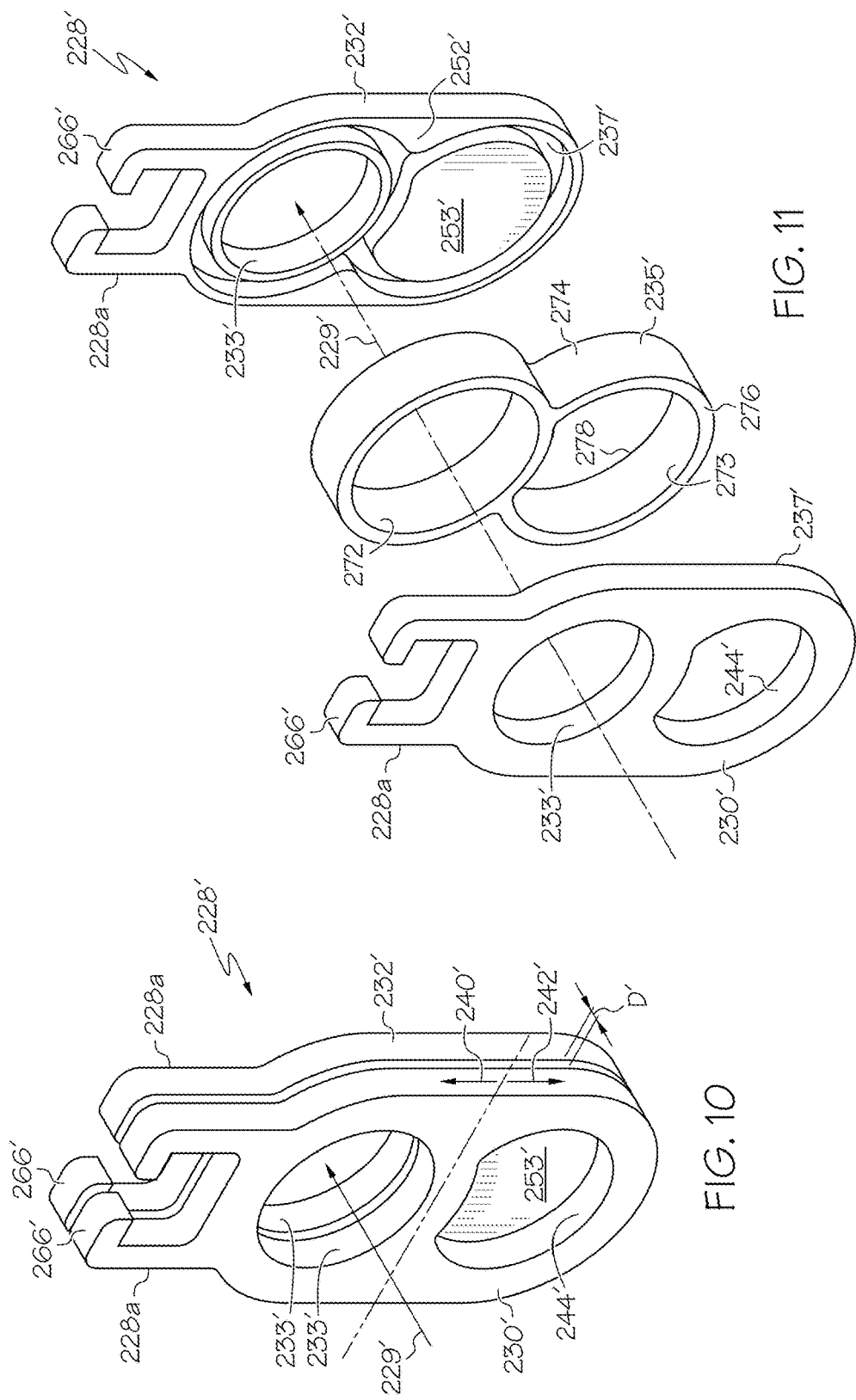

SPRUNG GATE VALVES MOVABLE BY AN ACTUATOR

RELATED APPLICATIONS

This application is a continuation of U.S. application Ser. No. 14/277,815, filed May 15, 2014, which claims the benefit of U.S. Provisional Application No. 61/829,463, filed May 31, 2013, which is incorporated herein by reference.

TECHNICAL FIELD

This application relates to sprung gate valves, more particularly to the construction of the sprung gate, which includes an endless elastic band between first and second gate members positioned to space them apart from one another a distance thereby defining a channel for fluid flow.

BACKGROUND

In the valve mechanism disclosed herein in FIGS. 2-4 it was discovered that there was more leak of fluid past the gate than suitable for some engine systems. Accordingly, there was a need to solve this problem with a gate that reduced the leak past the gate, which may act to lift the gate and interfere with an actuators control of the gate's movement, and/or allows for venting fluid from the pocket in which the gate is seated, in particular the pressurized air present if the valve mechanism is used in a boosted engine application.

The sprung gates disclosed herein solve these problems.

SUMMARY

In one aspect, valves having a sprung gate of various constructions are disclosed. In one embodiment, the sprung gate includes a first endless elastic band having an inner perimeter defining an open space sandwiched between a first gate member and a second gate member that each define an opening therethrough in an open position portion thereof. The first endless elastic band is sandwiched therebetween with its open space oriented for alignment with the opening in both of the first and second gate members, which are aligned with one another to form a passage through the sprung gate. In one aspect, the first endless elastic band in positioned inward a distance from the outer sides of the first and second gate members and spaces the first gate member a distance apart from the second gate member thereby defining a channel having a bottom defined by the first endless elastic band. The endless elastic band is generally an oval-shaped or generally 8-shaped. An endless elastic band enhances the seal of the sprung gate without adding excessive frictional hysteresis to the actuator.

In another aspect, the sprung gate includes a first endless elastic band having an inner perimeter defining an open space sandwiched between a first gate member and a second gate member that each define an opening therethrough in an open position portion thereof. The open space of the endless elastic band is oriented for alignment with the opening in both of the first and second gate members, which are aligned with one another to form a passage through the sprung gate. In this embodiment the first gate member also defines a second opening therethrough in a closed position portion thereof, which is aligned with a substantially continuous surface of an other member of the sprung gate. The other member may be the second gate member or an inner gate member. When the other member is the second gate member, the second gate member, in a closed position portion thereof, includes a plug projecting from its inner surface toward the second opening in the first gate member. When the other member is an inner gate member, the inner gate member defines an opening therethrough aligned with the openings in the open position portions of the first and second gate members and has substantially continuous exterior surfaces on opposing sides of a closed position portion thereof.

In another aspect, devices having such sprung gates are disclosed. The devices include a valve mechanism having a conduit separated into a first section and a second section by a pocket having one of the sprung gates described herein seated therein, and an actuator connected to the sprung gate to move the sprung gate between an open position and a closed position. In one embodiment, the actuator includes a rigid piston that is at least partially pneumatically activated. In another embodiment, the actuator is a snap actuator as described herein.

BRIEF DESCRIPTION OF THE DRAWINGS

FIG. 6 is a longitudinal cross-section of another embodiment of a snap actuator and valve having a sprung gate member and a vent port in fluid communication with the pocket housing the sprung gate member.

FIGS. 7-9 are a side perspective view, a bottom view, and a side perspective exploded view, respectively, of one embodiment of a sprung gate member.

FIGS. 10-11 are a side perspective view and a side perspective exploded view, respectively, of another embodiment of a sprung gate member.

DETAILED DESCRIPTION

Figure 1:
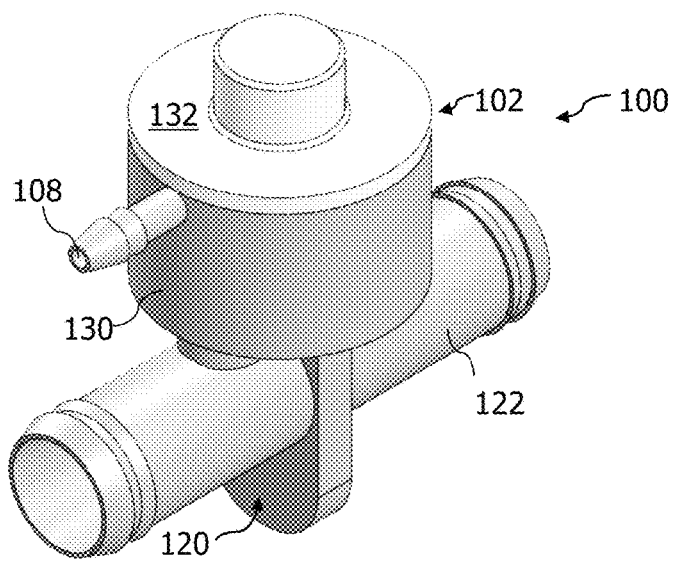
FIG. 1 is a front perspective view of one embodiment of a snap actuator and valve.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
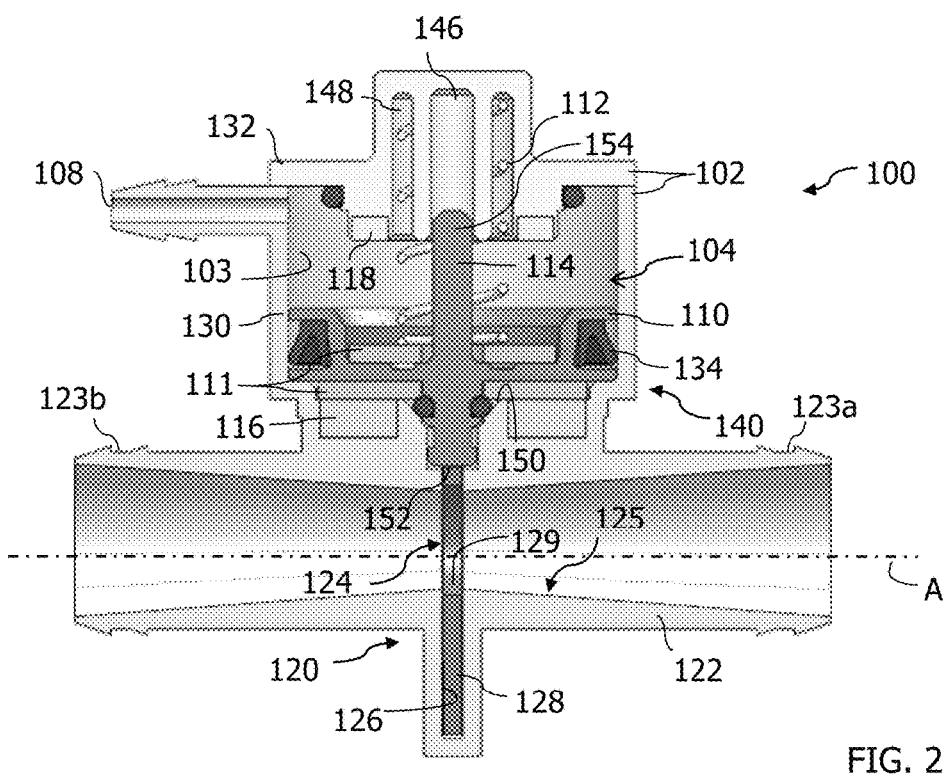
FIG. 2 is a cross-sectional view of the snap actuator and valve of FIG. 1 taken along the longitudinal axis of the conduit portion of the valve with the valve in a starting position.

FIGS. 1-4 illustrate one embodiment of a device 100 for use in an internal combustion engine, in particular as part of a brake vacuum boost system. The device 100 includes a housing 102 that may include a container portion 130 and a cap 132 defining an internal chamber 103 and having a port 108 in fluid communication with the chamber 103. As seen in FIGS. 1 and 2, the port 108 enters the housing 102 through the container portion 130. However, in the alternate embodiment illustrated in FIG. 6, the housing 102' again includes a container portion 130 and a cap 132, but here the port 108' enters the housing 102' through the cap 132. Preferably, the cap 132 is sealingly connected to the container portion 130.

Figures 3, 4:
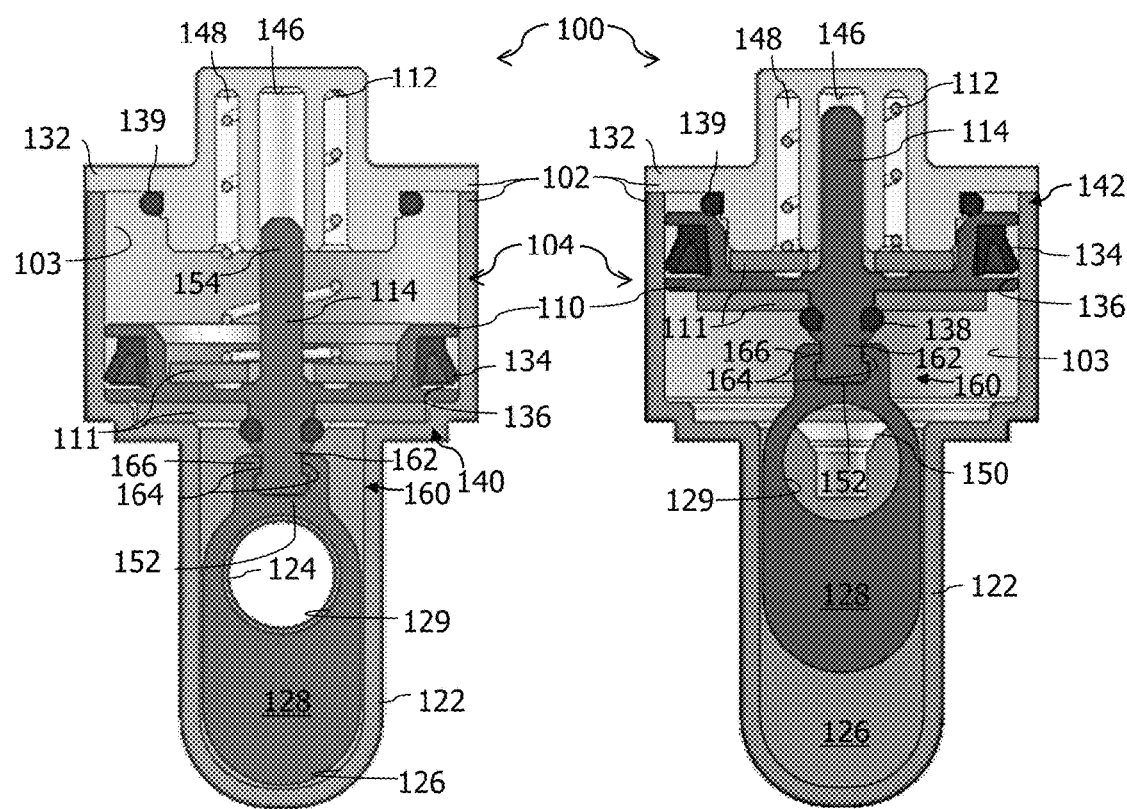
FIG. 3 is a cross-sectional view of the snap actuator and valve transvers to the longitudinal axis of the conduit through the gate member, with the valve in a starting position.
FIG. 4 is a cross-sectional view of the snap actuator and valve transvers to the longitudinal axis of the conduit through the gate member, with the valve in a secondary position.

Referring to FIGS. 2-4, housed within the chamber 103 is an actuator 104 that includes a piston 110 having a stem 114 connectable to a valve mechanism 120. The stem 114 has a proximal end 152 (which may be referred to herein as the coupling end) proximate to the valve mechanism 120 and a distal end 154 removed from the valve mechanism 120 (labeled in FIG. 2). The valve mechanism 120, in this embodiment, includes a conduit 122 having a valve opening 124 and a pocket 126 and includes a gate member 128 at least partially receivable in the pocket 126 and having a passage 129 therethrough. As seen in FIG. 2, the pocket 126 separates the conduit 122 into a first section 123*a* and a second section 123*b*. Other valves may be connected to the actuator 104 such as a poppet valve, a butterfly valve, or other known valves.

Figure 5:
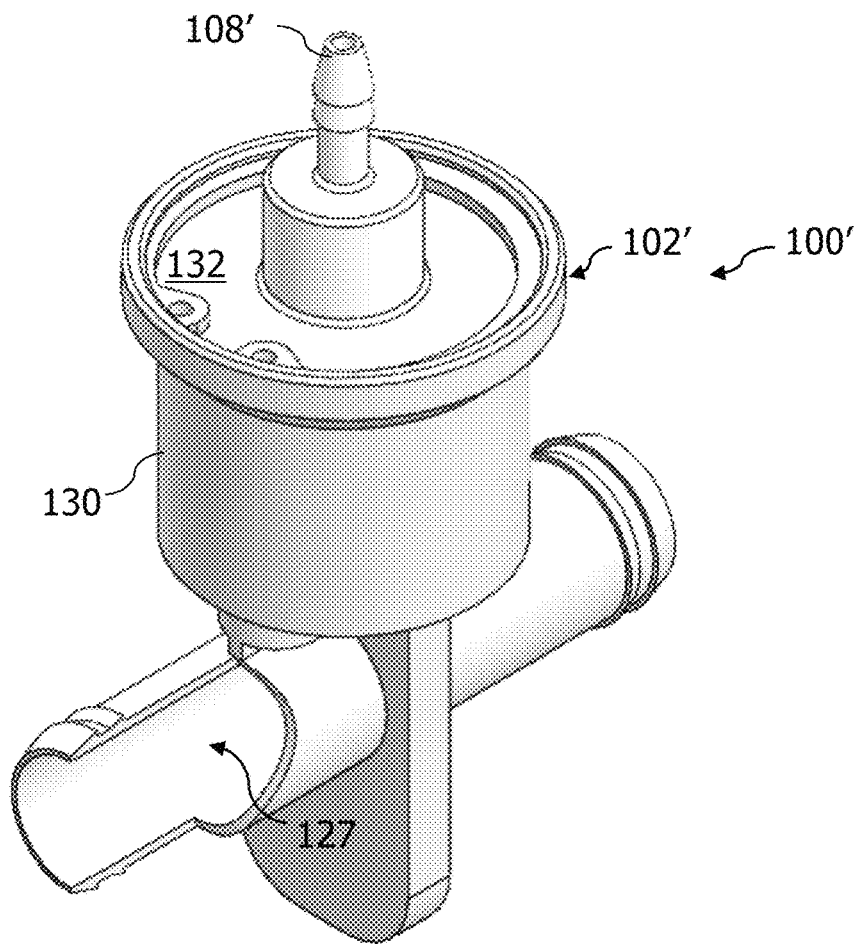
FIG. 5 is a front perspective view of another embodiment of a snap actuator and valve.

As seen in FIG. 2, the conduit 122 may be a tube that continuously, gradually tapers or narrows from both ends toward the valve opening 124, thereby having its smallest inner diameter at the valve opening 124. This hour glass-shaped cross-section 125, centered at the valve opening 124, reduces the friction force acting on the surfaces of the gate member 128 during its opening. This gradual narrowing of the conduit 122 also minimizes the pressure drop across the valve. In another embodiment, as seen in FIG. 5, the conduit 122 may have a uniform inner diameter 127 along its entire length.

In the embodiment of FIGS. 1-4, with the valve mechanism 120 having a gate member 128, the gate member 128 is connected to the piston 110 by a rail system 160 providing sliding movement of the gate member 128 along the longitudinal axis A (FIG. 2) of the conduit 122 thereby forming a seal within the conduit 122 in response to pressure within the conduit 122. The rail system 160 (best seen in FIGS. 3 and 4) includes a guide rail 162 near the proximal end 152 of stem 114. The guide rail 162 includes raceway grooves 164 on opposing sides thereof. The gate member 128 includes a slider 166 shaped and configured to fit over the guide rail 162 and conform to the raceway grooves 164.

The actuator 104 controls the opening and closing of the valve mechanism 120, in particular the gate member 128, in FIGS. 2-4, by the movement of the piston 110. As seen in FIGS. 3 and 4, the piston 110 is movable between a starting position 140 (FIG. 3) and a secondary position 142 (FIG. 4). The starting position 140 in this embodiment (FIG. 3) is an open position of the valve mechanism 120. In other embodiments, the starting position may be a closed position of the valve. The piston 110 at least partially includes a magnetically-attractable material 111 (or is made of such material) such that the piston 110 is attractable to a first magnet 116 and a second magnet 118 (seen in the cross-section of FIG. 2). A spring 112 is seated against the piston 110 to bias the piston 110 generally into the starting position 140 and the first magnet 116 is positioned to assist the spring 112 in maintaining the piston 110 in the starting position 140. The second magnet 118 is positioned to maintain the piston 110 in the secondary position 142 (FIG. 4), when the piston 110 moves to the secondary position 142.

The stem 114 of the piston may also extend therefrom opposite the valve mechanism, and, as seen in FIGS. 2-4, be received in a guide channel 146 within the cap 132. The cap 132 may also include a seat 148 for the spring 112. These features of the cap 132 provide alignment to the actuator and prevent twisting and/or buckling of the spring and piston.

The actuator 104 may include a first bumper 138 positioned to reduce noise between the piston 110 and the housing 102 when arriving in the starting position 140 and a second bumper 139 positioned to reduce noise between the piston 110 and the housing 102 when arriving in the secondary position 142. The first bumper 138 may also be positioned to seal the opening 150 between the housing 102 and the valve mechanism 120 (see FIGS. 2 and 4). In one embodiment, opening 150 may be defined by a generally frustoconical surface. The first and second bumpers 138, 139 may be seated in annular grooves within the housing 102 or on a component of the piston 110, such as the stem 114.

Still referring to FIGS. 2-4, the piston 110 may also include a sealing member 134 about its outer periphery as a lip seal against the interior surface of chamber 103. The outer periphery of the piston 110 may include an annular groove 136 in which to seat the sealing member 134. In one embodiment, the sealing member 134 may be an O-ring, a V-ring, or an X-ring. Alternately, the sealing member 134 may be any other annular seal made of sealing material for sealing engagement against another member.

In operation, the actuator 104 moves the piston 110 by the introduction of fluid into or the removal of fluid from the chamber 103 via the port 108 and the assistance of the magnets 116, 118. The piston 110 is seated in a starting position 140 (FIG. 3) and remains in this position held there by the spring force and the magnetic force of the first magnet 116, which may correspond to either an open or a closed position for an attached valve, until a threshold force is applied to the piston 110 that overcomes the spring force and magnetic force of the first magnet. Once this threshold force is reached, the piston 110 will move the full length of its travel to its secondary position 142 (FIG. 4) with the assistance of the magnetic force of the second magnet, which thereafter maintains the piston 110 in the secondary position 142. The movement of the piston 110 through its full length of travel is a quick, nearly instantaneous movement substantially without pause therebetween, i.e., there is no lag or floating of the piston in between the starting position 140 and the secondary position 142, which may be described as a "snap" movement of the piston. This "snap," which without bumpers is an audible sound, is a result of the magnetic attraction of the second magnet 118 for the piston 110, which acts to quickly move the piston to the secondary position 142. The second magnet 118 thereafter holds or maintains the piston 110 in the secondary position until a lower threshold force is reached, at which point the piston moves back to its starting position 140 by again moving the full length of its travel as a snap-type movement.

The movement of the piston from its starting position to its secondary position may be described as a "snap" movement. This "snap" is a quick, nearly instantaneous movement of the piston the full length of its travel between the starting and secondary positions without a lag or floating of the piston therebetween. The "snap" action of the actuator as it travels between the starting position and the secondary position is facilitated by the presence of the magnets, which attract and pull the piston between the two positions. This is such a quick movement that without bumpers to reduce the noise, a snap-like sound can be heard as the piston contacts the housing as it arrives in the alternate position, which depending on the configuration of the actuator may be an "on" or an "off" position of the attached valve.

FIG. 6 illustrates another embodiment of a valve device, generally designated as reference 200, for use in an internal combustion engine. The device 200 includes a housing 102 that may include a container portion 130 and a cap 132 defining an internal chamber 103 and having a port 108 in fluid communication with the chamber 103. As seen in FIG. 6, the port 108 enters the housing 102 through the container portion 130 and the cap portion 132, but is not limited thereto. As illustrated in alternate embodiments herein, the port 108 may enter through either the container portion 130 or the cap portion 132 individually. Housed within the chamber 103 is an actuator 104 that includes a piston 110 having a stem 114 connectable to a valve mechanism 120, a spring 112 for biasing the piston 110 into a first position, and one or more magnets 116 for magnetically attracting the piston 110, as described above.

The device 200 may include a position sensor 92 to sense the position of the piston 110 and allow for feedback to a controller (not shown) that controls the fluid flow through port 108 into chamber 103. The position sensor may be as described in U.S. Provisional Application No. 61/662,255, incorporated herein by reference for all that it discloses about position sensors and their application in actuators.

The valve mechanism 120 in FIG. 6 includes a conduit 122 having a valve opening 124 and a pocket 126 and includes a sprung gate 228 at least partially receivable in the pocket 126 and having a passage 229 passing through the sprung gate 228. The sprung gate 228 is moveable linearly within pocket 126 in response to the linear movement of the piston 110 to move the sprung gate 228 between an open position (see FIG. 3) and a closed position (see FIG. 4) within the conduit 122. The conduit 122 is as described above. The valve opening 124 of the conduit may be a maximum of about 2 inches (50.8 mm) in diameter. In another embodiment, the valve opening 124 is about 1 inch (25.4 mm) in diameter or less. In another embodiment, the valve opening 124 is about 0.5 inch (12.7 mm) in diameter or less. In another embodiment, the valve opening is dimensioned to have a diameter between about 0.25 inch (6.35 mm) and about 0.5 inch (12.7 mm).

Referring to FIGS. 7-9, one embodiment of a sprung gate, generally designated as reference number 228, is illustrated. The sprung gate 228 includes a first gate member 230, a second gate member 232, and an endless elastic band 234 received between the first and second gate members 230, 232. The endless elastic band 234 may be described as being sandwiched between the first and second gate members 230, 232. As seen in FIG. 9, the second gate member 232 includes a track 236, for receiving a portion of the endless elastic band, as a portion of its interior surface 252. While not visible in FIGS. 7-9, the first gate member 230 also includes a track 236. In one embodiment, the elastic material is a natural or synthetic rubber.

The first and second gate members 230, 232 may be the same or substantially similar members, but are not limited thereto. As illustrated in FIGS. 7 and 9 the first and second gate members 230, 232 are the same and can either be the left or the right side of the gate 228, as oriented relative to the page upon which the figures are printed. This allows similar performance of the valve regardless of the direction of fluid flow in the conduit 122.

Referring to FIGS. 7 and 9, the first and the second gate members 230, 232 both have an opening 233 therein that defines a portion of passage 229. In an open position, such as illustrated in FIG. 6, the passage 229 through the sprung gate 228 is aligned with the conduit 122 to allow fluid to flow therethrough. The portion of the gate having passage 229 is referred to herein as the open position portion 240 (FIG. 7), and the adjacent portion, located opposite the slider 266, is referred to as the closed position portion 242 because this portion of the gate 228, when moved to a closed position obstructs the conduit 122 to prevent fluid flow therethrough. The closed position portion 242 of each gate member 230, 232 has a substantially smooth continuous exterior surface 250.

Here, the endless elastic band 234 is generally oval shaped and thereby includes an inner perimeter 282 defining an open space, an outer perimeter 284, and opposing first and second sides 286, 288. The endless elastic band 234 is received in the tracks 236 of the first and second gate members 230, 232 with the first side 286 received in one track 236 and the second side 288 received in the other track 236. When the endless band 234 is seated in the tracks 236 of the first and second gate members 230, 232 the first and the second gate members 230, 232 are spaced apart from one another by a distance D (FIG. 7). The tracks 236 are positioned to inset the endless elastic band 234 a distance from the outer perimeter of the gate members as well. As seen in FIG. 8, this construction defines a channel 254 around the outer surface of the endless elastic band 234 between the first and second gate members 230, 232 for fluid flow around the sprung gate 228 within the pocket 126 for fluid communication with a vent port 170 shown in FIG. 6. This venting via channel 254 is generally perpendicular to the direction of fluid flow through the conduit 122 and vents fluid from the pocket 126 as the gate moves more fully into the pocket.

The endless elastic band 234 is compressible between the first and the second gate members 230, 232 and therefore functions as a spring acting parallel to the direction of flow through the conduit 122. The endless elastic band 234 biases the first and second gate members into a sealing engagement with opposing walls of the pocket 126. Additionally, the endless elastic band 234 is expandable radially outward in response to forces applied to the endless elastic band 234 by the fluid flowing through the conduit to form a seal between the endless elastic band 234 and the outer wall portion of the tracks 236 in the first and second gate members 230, 232.

In operation, in the open position as illustrated in FIG. 6, the fluid flowing through the conduit, whether flowing left to right or right to left, passes through passage 229 in the sprung gate 228 and the pressure of the fluid provides a force acting on the endless elastic band 234 directed radially outward thereby pressing the endless elastic band into sealing engagement with the outer perimeter of the tracks 236. This sealing engagement reduces or prevents fluid leakage into the actuator, which renders the gate 228 in the embodiment of FIGS. 7-9 more leak resistant than the gate member illustrated in FIGS. 3 and 4, which is a single-bodied, rigid gate. This embodiment is particularly suited for use with naturally aspirated engines, in particular with air flowing at atmospheric or sub-atmospheric pressures through the conduit 122. However, in an embodiment where the conduit 122 is connected to the boost pressure side of a supercharged air intake system, the leak protection provided by the endless elastic band 234 aides in preventing the fluid flowing through the conduit 122 from generating pressures within the pocket 126 which could act to push the sprung gate 228 (and hence the piston 110) to another position or otherwise impede controlled movement thereof. The pressures in the supercharged engine, and experienced by the sprung gate 228 generally range between about 5 psi and about 30 psi.

The endless elastic band 234 also produces a gate that is less sensitive to manufacturing tolerances, in particular with respect to the dimensions of pocket 126 and the thickness of the gate members 230, 232 because of the presence of the endless elastic band 234. The pocket 126 is typically formed to have a width that is smaller than the unloaded width of the sprung gate 228 so as to produce an interference fit. In the sprung gate 228, the endless elastic band 234 becomes compressed between the first and second gate members 230, 232 as the sprung gate 228 is inserted into the pocket 126. The endless elastic band's biasing action on the first and second gate members 230, 232 when inserted (wedged) into the pocket 126 biases or presses each respective gate member into a sealing engagement with a wall of the pocket to reduce or prevent leaks. Most importantly, the substantially lower modulus of elasticity of the endless elastic band versus that of the rigid gate members 230, 232, or that of a single rigid gate, means that the normal forces acting upon the sprung gate 228 and resisting linear movement of the assembly along its path are substantially less. This reduces the frictional forces (Frictional force is equal to the normal force times the coefficient of friction) and thus the required solenoid operating force. This benefit is equally applicable to the other embodiments described below.

Referring now to FIGS. 10 and 11, a second embodiment of a sprung gate, generally designated as reference number 228', is provided, that similarly to FIGS. 7-9, includes a first gate member 230', a second gate member 232', and an endless elastic band 235 received between the first and second gate members 230', 232'. The endless elastic band 235 may be described as being sandwiched between the first and second gate members 230', 232'. As seen in FIG. 9, the second gate member 232' includes a track 237 as a portion of its interior surface 252' for receiving a portion of the endless elastic band 235. While not visible in FIGS. 10 and 11, the first gate member 230' also includes a track 237. Both gate members 230', 232' also include a slider 266' for slidingly connecting the gate 228' to a coupling end 152 of the piston 110 (FIG. 6) as described above.

Here, as generally illustrated in FIG. 11, the endless elastic band 235 is generally a figure-eight shaped band of elastic material and thereby includes a first inner perimeter 272 defining a first open space, a second inner perimeter 273 defining a second open space, an outer perimeter 274, and opposing first and second sides 276, 278. The endless elastic band 235 is received in the tracks 237 of the first and second gate members 230', 232' with the first side 276 received in one track 237 and the second side 278 received in the other track 237. Since the endless elastic band 235 is figure-eight shaped, the track 237 is also typically figure-eight shaped. When the endless band 235 is seated in the tracks 237 of the first and second gate members 230', 232', the first and the second gate members 230', 232' are spaced apart from one another by a distance D' (FIG. 10). The tracks 237 are positioned to recess the endless elastic band 235 a distance from the outer perimeter (i.e., inward a distance from the outer sides) of the first and second gate members 230', 232' to provide venting as described above with respect to FIGS. 6-9.

The first and second gate members 230', 232' are structurally different from one another, but both have a first opening 233' therein that defines a portion of passage 229 which, in an open position, is aligned with the conduit 122 to allow fluid to flow therethrough. This portion of the gate is referred to as the open position portion 240' (FIG. 10), and the adjacent portion thereto, opposite the slider 266', is referred to as the closed position portion 242' because this portion of the gate 228', when moved to a closed position, obstructs the conduit 122 to prevent fluid flow therethrough. In this embodiment, the closed position portion 242' of the first gate member 230' includes a second opening 244 therethrough. The second opening may be dimensioned substantially the same as the first opening 233'. The second gate member 232' does not include a second opening in the closed position portion 242' thereof. Instead, the closed portion 242' of the second gate member 232' has a substantially continuous smooth exterior surface. The second gate member 232' may include a plug 253 projecting from its inner surface 252'. This plug 253 fits within the dimensions of the second open space defined by the endless elastic band 235 and is dimensioned to be at least the size of the second opening 244 in the first gate member 230', which defines a smaller opening than the second inner perimeter 273 of the endless elastic band 235. The plug 253 may be a substantially smooth portion of the interior surface 252' of the second gate member 232'.

In the open position, fluid flowing through passage 229 provides a force acting on the endless elastic band 235 directed radially outward thereby pressing the endless elastic band into sealing engagement with the outer perimeter of the tracks 237. This sealing engagement reduces or prevents fluid leakage into the actuator and pocket 126, which renders the sprung gate 228' in the embodiment of FIGS. 10 and 11 more leak resistant than the gate member illustrated in FIGS. 3 and 4.

In the closed position, the fluid flow in the conduit 122 may be in the direction toward the side of the sprung gate 228' defined by the first gate member 230'. In particular, this orientation of flow is beneficial when the conduit 122 is connected to the boost pressure side of a supercharged air intake system and is generally operated to stop boost pressure from flowing therethrough. This is so because the boost pressure passes through the second opening 244 and is directed by the plug 253 toward the second inner perimeter 273 of the endless elastic band 235 to act radially outwardly on the endless elastic band to sealingly engage it against the tracks 237 of the first and second gate members 230', 232'. The presence of the second opening 244 also minimizes the surface area of the exterior surface of the first gate member 230' upon which the boost pressure can apply a force acting parallel to the flow direction within the conduit 122 to axially compress the endless elastic band 235. If the boost pressure does compress the endless elastic band 235 in the axial direction, one of the gate members 230', 232' would move closer to the other, decreasing D', and creating a gap between one wall of the pocket 126 and that gate member through which fluid could leak. This is an undesirable result. Accordingly, for gate member 228', it would be undesirable for the boost pressure to flow into the conduit in a direction that would impact the second gate member's 232' substantially continuous smooth exterior surface.

Figure 14:
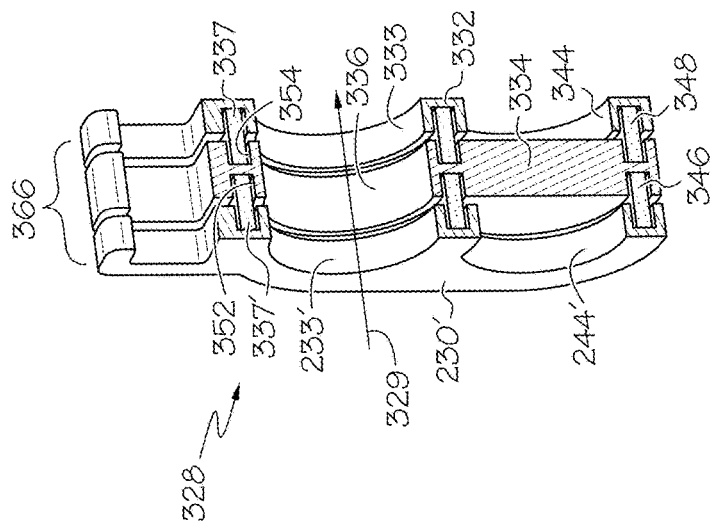
FIGS. 12-14 are a side perspective view, a front view, and a longitudinal cross-section of yet another embodiment of a sprung gate member.
Figure 13:
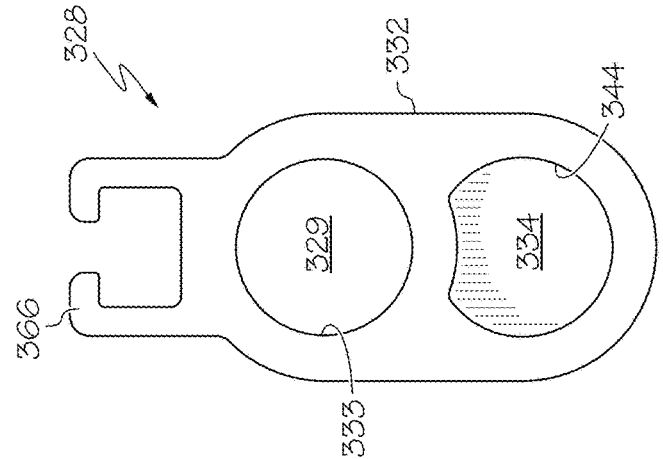
Figure 12:
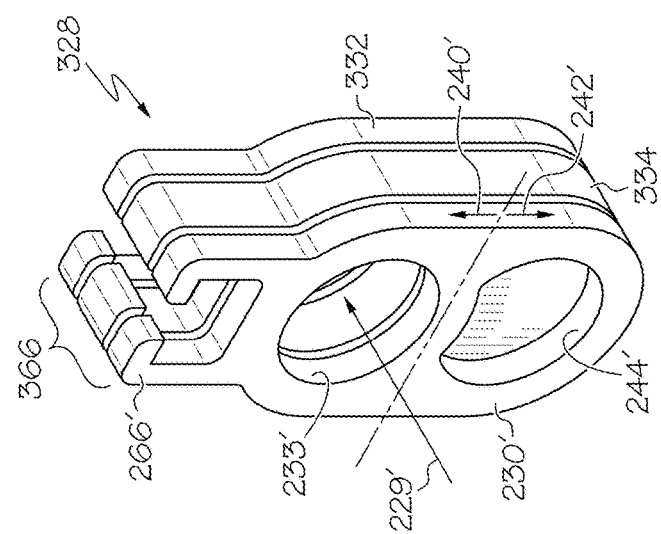

Referring now to FIGS. 12-14, a universal sprung gate (operable with flow directed toward either of the first or the second gate members) is illustrated and designated by reference numeral 328. The universal sprung gate 328 has same first gate member 230' as the embodiment in FIGS. 10 and 11, a second gate member 332 that has the same general construction as the first gate member 230', an inner gate member 334 that provides the obstruction necessary for the closed position, a first endless elastic band 346 disposed within a track defined between the first gate member 230' and the inner gate member 334, and a second endless elastic band 348 disposed within a track defined between the second gate member 332 and the inner gate member 334. The second gate member 332, see FIG. 13, includes a first opening 333 in the open position portion 240', and a second opening 344 in the closed position portion 242' thereof, and may include a slider 366. The inner gate member 334 includes an opening 336 in an open position portion 240' thereof and has opposing substantially continuous exterior surfaces defining the closed position portion 242', which can obstruct the flow of fluid through the conduit when the universal sprung gate 328 is in the closed position.

In the embodiment of FIGS. 12-14, the figure-eight shaped endless elastic band is preferred because of the two openings in each of the first and second gate members 230', 332. The figure-eight shaped endless elastic bands 346, 348 are as described above. Here, the first endless elastic band 346 is seated both in a first track 352 in the inner gate member 334 and in a track 237 in the first gate member 230', which are preferably in the shape of a figure-eight dimensioned to receive the first endless elastic band 346. Similarly, the second endless elastic band 348 is seated both in a second track 354 in the inner gate member 334 and in a track 337 in the second gate member 332, which are preferably in the shape of a figure-eight dimensioned to receive the second endless elastic band 348.

In operation, the universal sprung gate 328, in the open position and in the closed position, operates as described above with respect to the first gate member side of the sprung gate 228' of FIGS. 10 and 11. The universal sprung gate 328 may be used in normally aspirated, supercharged, or turbocharged engines without requiring any particular flow orientation. Its universal nature and the benefit of the reduced surface area in the closed position portion of each of the first and second gate members makes this gate function to seal the gate to reduce or prevent leakage into the piston actuator 100, 200 and pocket 126 regardless of the direction of flow through the conduit. This embodiment also has the benefit of providing a multiple channels 254 around the exterior of the endless elastic band to provide fluid communication between the actuator and the vent port 170 (FIG. 6) as described above.

Figure 15:
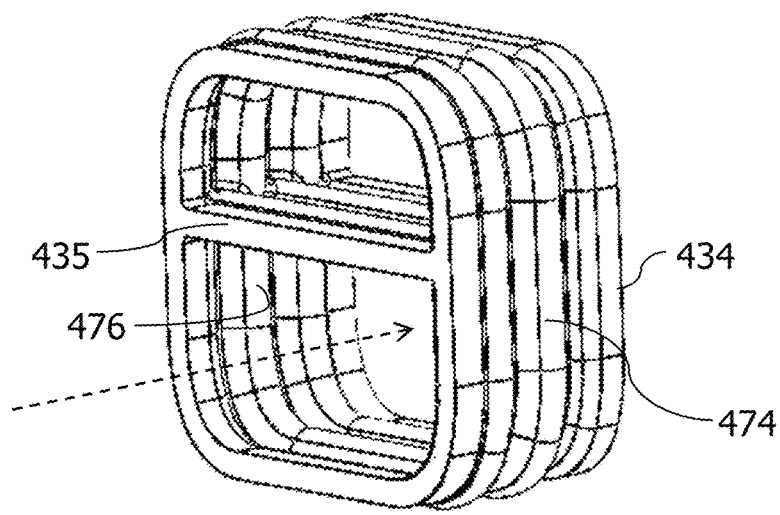
FIG. 15 is an embodiment for a bellowed, endless elastic band.
Figure 16:
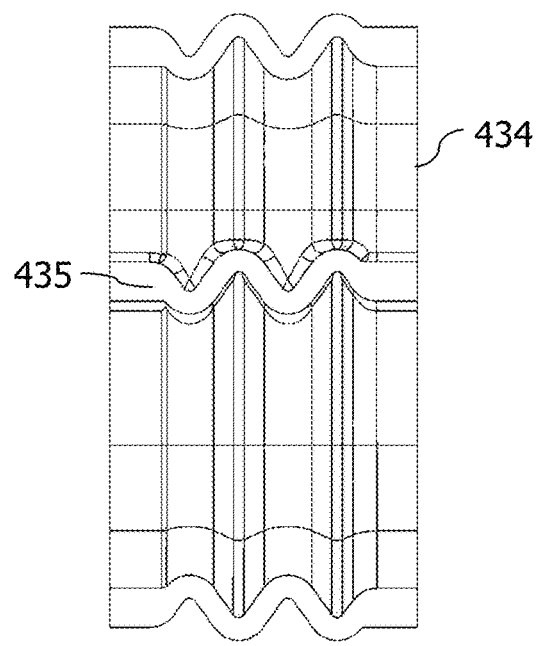
FIG. 16 is a longitudinal cross-sectional view of the bellowed, endless elastic band of FIG. 15.

In each embodiment of the sprung gates disclosed herein, the endless elastic band was illustrated as a generally smooth band having a generally rectangular cross-section as seen in FIGS. 6 and 14. The endless elastic band, however, is not limited to such a construction. In another embodiment, the endless elastic band may have a generally irregular inner and outer surface as seen in FIGS. 15 and 16. In this embodiment, the endless elastic band, is generally referred to as a bellowed, endless elastic band 434, which has an undulating outer perimeter 474 and an inner perimeter 476 oppositely undulating relative thereto. When the endless elastic band 434 has the generally 8-shaped configuration, the cross member 435, forming the center of the eight, may also be bellowed. The bellows in the cross member 435 and the main part of the band, as shown in FIGS. 15 and 16, are oriented transverse to the direction of fluid flow through the conduit and, hence, through the endless elastic band itself. The bellowed, elastic band 434 is advantageous because it provides more even compression of the band between the first and second gate members.

Having described the invention in detail and by reference to preferred embodiments thereof, it will be apparent that modifications and variations are possible without departing from the scope of the invention which is defined in the appended claims.

What is claimed is:

1. A sprung gate for a valve comprising:
an endless elastic band having an inner perimeter defining an open space; and
a first gate member and a second gate member each defining an opening therethrough in an open position portion thereof;
wherein the endless elastic band is compressed between the first and second gate members with the open space thereof oriented for alignment with the opening in both of the first and second gate members, which are aligned to form a passage through the sprung gate;
wherein the first gate member defines a second opening therethrough in a closed position portion thereof, and the second gate member, in a closed position portion thereof, includes a plug projecting from its inner surface toward the second opening in the first gate member;
wherein the plug defines a smooth portion of the interior surface of the second gate member that directs flow entering through the second opening of the first gate member toward the inner perimeter of the endless elastic band to act radially outwardly on the endless elastic band.

2. The sprung gate of claim 1, wherein the endless elastic band is generally oval-shaped or is generally 8-shaped.

3. The sprung gate of claim 1, wherein the first and second gate members each include an actuator connector portion.

4. The sprung gate of claim 1, wherein the first and second gate members each include a track in which the endless elastic band is seated.

5. The sprung gate of claim 1, wherein the endless elastic band is a bellowed elastic band, wherein the bellows are oriented transverse to the direction of flow therethrough.

6. The sprung gate of claim 1, wherein the endless elastic band is positioned inward a first distance from the outer sides of the first and second gate members and spaces the first gate member a second distance apart from the second gate member.

7. A device comprising:
a valve mechanism comprising a conduit separated into a first section and a second section by a pocket having a sprung gate of claim 1 seated therein; and
an actuator connected to the sprung gate;
wherein the actuator moves the sprung gate between an open position and a closed position.

8. The device of claim 7, wherein the actuator includes a rigid piston that is at least partially pneumatically activated.

9. The device of claim 7, wherein the endless elastic band is generally oval-shaped or is generally 8-shaped.

10. The device of claim 7, wherein the pocket includes a vent port.

11. The device of claim 7, wherein the endless elastic band acts as a spring and biases the first and second gate members into a sealing engagement with opposing walls of the pocket.

12. The device of claim 7, wherein the first and second gate members each include a track in which the endless elastic band is seated, and the endless elastic band is expandable radially outward to form a seal between the endless elastic band and an outer wall of each track.

* * * * *